US011514933B1

(12) United States Patent
Chien et al.

(10) Patent No.: US 11,514,933 B1
(45) Date of Patent: Nov. 29, 2022

(54) METHOD TO ENHANCE MAGNETIC STRENGTH AND ROBUSTNESS OF REAR HARD BIAS FOR DUAL FREE LAYER READ

(71) Applicant: Western Digital Technologies, Inc., San Jose, CA (US)

(72) Inventors: Chen-Jung Chien, Mountain View, CA (US); Ming Mao, Dublin, CA (US); Daniele Mauri, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/398,714

(22) Filed: Aug. 10, 2021

(51) Int. Cl.
*G11B 5/39* (2006.01)

(52) U.S. Cl.
CPC ............ *G11B 5/3932* (2013.01); *G11B 5/398* (2013.01); *G11B 5/3912* (2013.01); *G11B 5/3945* (2013.01)

(58) Field of Classification Search
None
See application file for complete search history.

(56) References Cited

U.S. PATENT DOCUMENTS

| | | | | |
|---|---|---|---|---|
| 5,434,826 A * | 7/1995 | Ravipati | ............... | G11B 5/3903 |
| 7,515,388 B2 * | 4/2009 | Zhang | ................... | G11B 5/3932 |
| | | | | 29/603.07 |
| 7,688,555 B2 | 3/2010 | Zhang et al. | | |
| 8,004,800 B2 | 8/2011 | Freitag | | |
| 8,603,593 B1 | 12/2013 | Roy et al. | | |
| 8,711,528 B1 * | 4/2014 | Xiao | ..................... | G01R 33/098 |
| | | | | 360/122 |
| 9,076,468 B1 * | 7/2015 | Keener | ................... | G11B 5/398 |
| 9,099,122 B2 | 8/2015 | Jiang et al. | | |
| 9,147,404 B1 | 9/2015 | Luo et al. | | |
| 9,165,574 B2 * | 10/2015 | Covington | ............... | G11B 5/33 |
| 9,378,761 B1 * | 6/2016 | Seagle | ................. | G11B 5/3954 |
| 9,384,763 B1 | 7/2016 | Liu et al. | | |
| 9,449,621 B1 * | 9/2016 | Mauri | ................... | G11B 5/3906 |
| 9,472,216 B1 * | 10/2016 | Mauri | ................... | G11B 5/3932 |
| 9,922,672 B1 * | 3/2018 | Mauri | ................... | G11B 5/3951 |
| 10,777,222 B1 * | 9/2020 | Liu | ....................... | G11B 5/3954 |
| 11,087,785 B1 | 8/2021 | Mao et al. | | |
| 11,170,809 B1 * | 11/2021 | Mao | ....................... | G11B 5/3954 |
| 2005/0213265 A1 * | 9/2005 | Gill | ....................... | G11B 5/3903 |
| | | | | 360/324.12 |

(Continued)

OTHER PUBLICATIONS

Handbook of Spintronics: https://link.springer.com/referenceworkentry/10.1007%2F978-94-007-6892-5_35.

*Primary Examiner* — William J Klimowicz
(74) *Attorney, Agent, or Firm* — Patterson & Sheridan, LLP; Steven H. VerSteeg

(57) ABSTRACT

The present disclosure generally relates to read heads having dual free layer (DFL) sensors. The read head has a sensor disposed between two shields. The sensor is a DFL sensor and has a surface at the media facing surface (MFS). Recessed from the DFL sensor, and from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB bulk layer includes a first bulk layer and a second bulk layer, the first bulk layer having a different density relative to the second bulk layer.

13 Claims, 8 Drawing Sheets

(56) References Cited

U.S. PATENT DOCUMENTS

| | | | |
|---|---|---|---|
| 2006/0132988 A1* | 6/2006 | Zhang | B82Y 10/00 |
| | | | 360/324.12 |
| 2006/0158793 A1* | 7/2006 | Arasawa | B82Y 25/00 |
| 2009/0262465 A1* | 10/2009 | Hatatani | G11B 5/3912 |
| | | | 427/131 |
| 2010/0172053 A1* | 7/2010 | Zhang | G11B 5/3932 |
| | | | 427/127 |
| 2010/0276272 A1 | 11/2010 | Zheng et al. | |
| 2011/0181987 A1* | 7/2011 | Shiimoto | G11B 5/3954 |
| 2012/0161263 A1 | 6/2012 | Maat et al. | |
| 2014/0057133 A1* | 2/2014 | Boonstra | G01R 33/093 |
| | | | 428/810 |
| 2014/0118862 A1* | 5/2014 | Covington | G11B 5/11 |
| | | | 360/128 |
| 2021/0390978 A1* | 12/2021 | Hu | G11B 5/3909 |
| 2022/0115035 A1* | 4/2022 | Mao | G11B 5/3932 |

* cited by examiner

METHOD TO ENHANCE MAGNETIC STRENGTH AND ROBUSTNESS OF REAR HARD BIAS FOR DUAL FREE LAYER READ

BACKGROUND OF THE DISCLOSURE

Field of the Disclosure

Embodiments of the present disclosure generally relate to a dual free layer (DFL) tunnel magnetic resistive (TMR) read head having a rear hard bias (RHB) structure.

Description of the Related Art

Read heads typically include an antiferromagnetic (AFM) layer, which results in a fairly large spacing between shields. A read head without an AFM layer can shrink the distance between shields while also eliminating head instabilities that come from thermal fluctuations in AFM grains.

One such read head is a dual free layer (DFL) read head that has a DFL sensor. A DFL read head does not have an AFM layer, but instead has two free layers individually stabilized longitudinally by antiferromagnetically coupled (AFC) soft bias (SB) structures on either side of the sensor between the shields. The DFL sensor operates in a scissor mode when transversally biased at the stripe back edge by a permanent magnetic or rear hard bias (RHB) structure that delivers twice as high of a readout amplitude with self-noise cancellation. RHB structures with good magnetic properties, in particular, high coercivity, enable the DFL reader to be more robust against the application of longitudinal fields when integrating the DFL reader with a writer.

Therefore, there is a need in the art for an improved DFL read head with a strong RHB magnetic field and enhanced coercivity.

SUMMARY OF THE DISCLOSURE

The present disclosure generally relates to read heads having dual free layer (DFL) sensors. The read head has a sensor disposed between two shields. The sensor is a DFL sensor and has a surface at the media facing surface (MFS). Recessed from the DFL sensor, and from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB bulk layer includes a first bulk layer and a second bulk layer, the first bulk layer having a different density relative to the second bulk layer.

In one embodiment, a magnetic read head is provided having a first shield, a second shield spaced from the first shield, and a sensor disposed between the first shield and the second shield. A rear hard bias (RHB) structure is disposed between the first shield and the second shield, and recessed from a media facing surface (MFS). The RHB structure includes a RHB seed layer, a first bulk layer comprising a first RHB density, and a second bulk layer having a second RHB density. The first RHB density is different from the second RHB density.

In another embodiment, a magnetic read head is provided having a first shield, a dual free layer (DFL) sensor, and a rear hard bias (RHB) structure. The RHB includes a seed layer, a first bulk layer, and a second bulk layer. The RHB structure includes an RHB coercivity (Hcr) greater than 3100 Oe.

In another embodiment, a magnetic read head is providing having a first shield, a second shield spaced from the first shield, a sensor disposed between the first shield and the second shield, and a rear hard bias (RHB) structure disposed between the first shield and the second shield, and recessed from the sensor. RHB structure includes a multilayer seed structure, a first bulk layer comprising CoPt and having a first bulk thickness, and a second bulk layer comprising CoPt and having a second bulk thickness, the second thickness is about 4 to 15 times of the first thickness of the first bulk layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to read heads having dual free layer (DFL) sensors. The read head has a sensor disposed between two shields. The sensor is a DFL sensor and has a surface at the media facing surface (MFS). Behind the DFL sensor, and recessed from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB bulk layer includes a first bulk layer and a second bulk layer, the first bulk layer having a different density relative to the second bulk layer.

Figure 1:
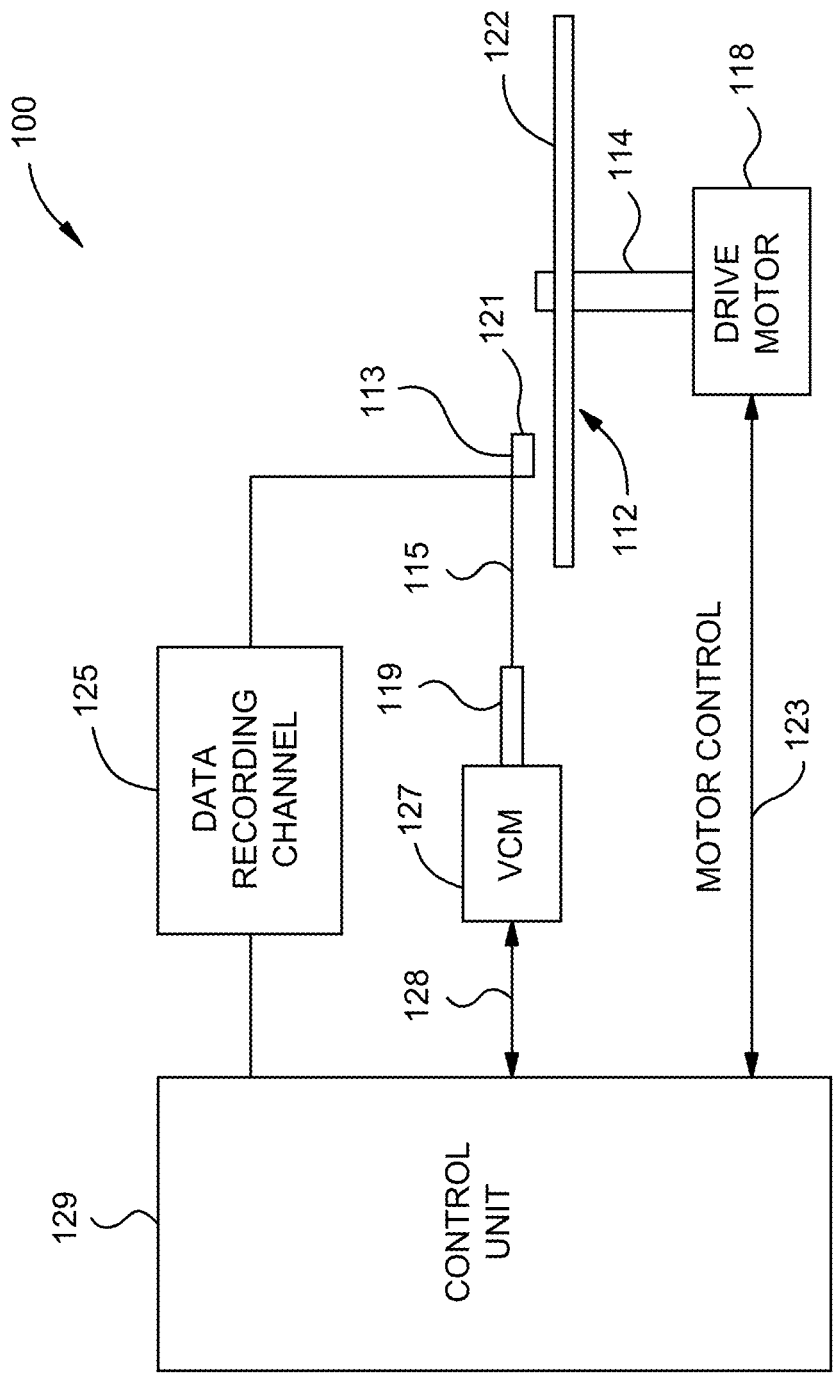
FIG. 1 is a schematic illustration of certain embodiments of a magnetic media drive including a magnetic read head, according to one embodiment.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head comprising a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
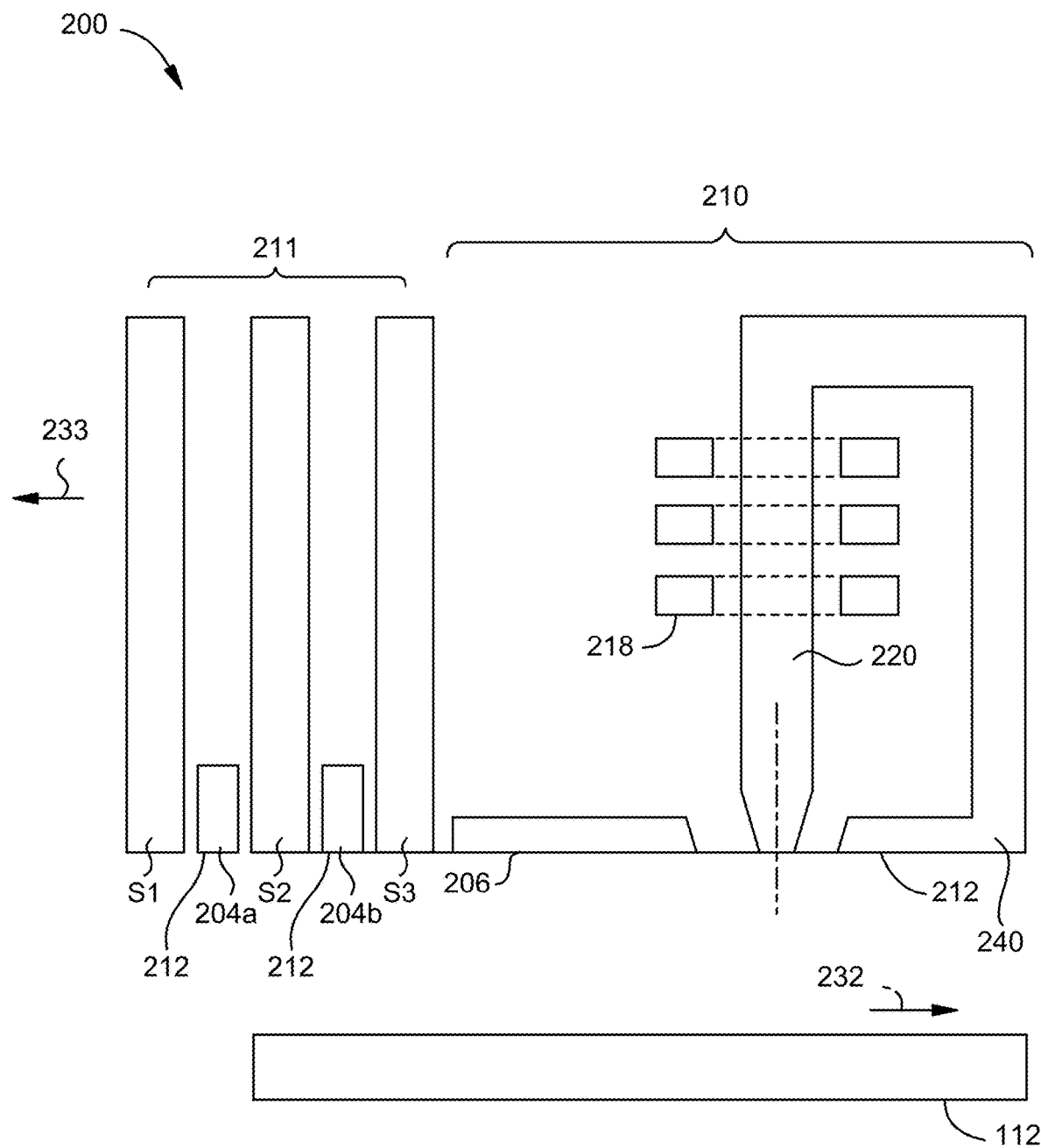
FIG. 2 is a schematic illustration of certain embodiments of a cross sectional side view of a head assembly facing a magnetic storage medium, according to some embodiments.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a disposed between shields S1 and S2, and a second sensing element 204b disposed between the shields S2 and S3. The sensing element 204a and the shields S1 and S2 each have a MFS 212 facing the magnetic disk 112. The sensing element 204b and the shields S2 and S3 each have a MFS 212 facing the magnetic disk 112. The sensing elements 204a, 204b are TMR devices sensing the magnetic fields of the recorded bits, such as perpendicular recorded bits or longitudinal recorded bits, in the magnetic disk 112 by a TMR effect. In certain embodiments, the spacing between shields S1 and S2 and the spacing between shields S2 and S3 is about 17 nm or less.

The head assembly 200 may optionally include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the TS 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," U.S. application Ser. No. 16/365,034, filed Mar. 31, 2019, now U.S. Pat. No. 10,991,390, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 3A:
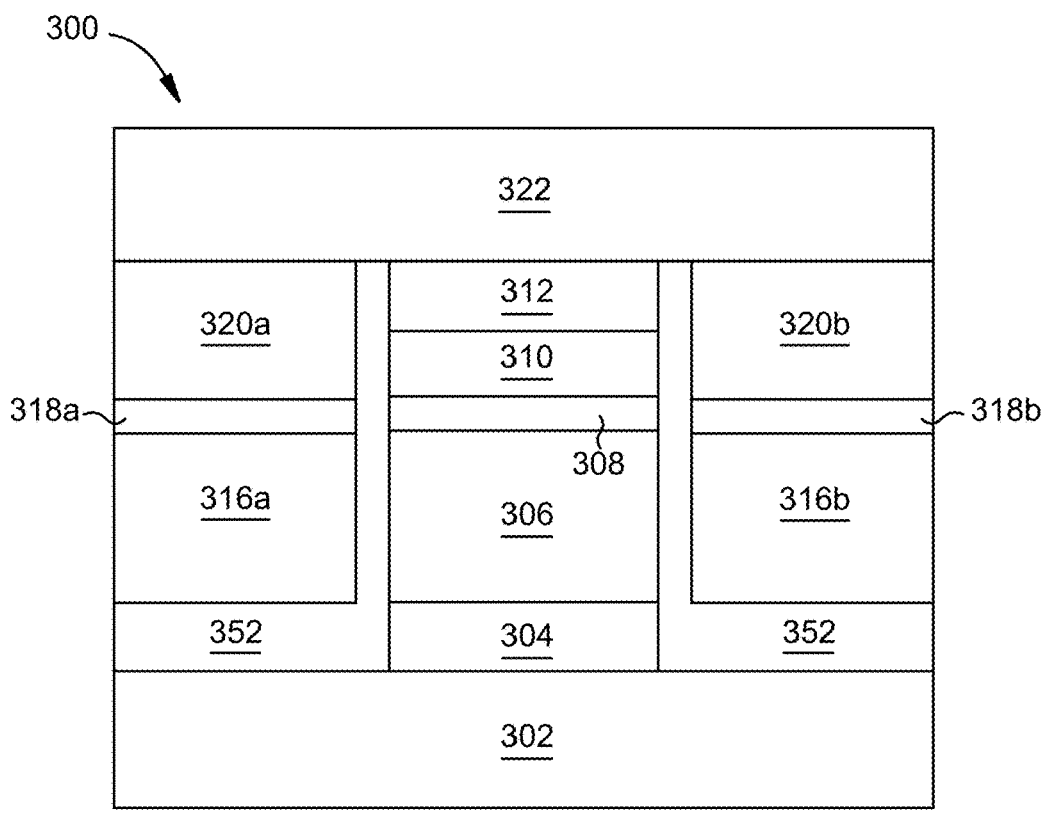
FIG. 3A is a schematic cross-sectional view of a single read head from the media facing surface (MFS), according to one embodiment.
Figure 3B:
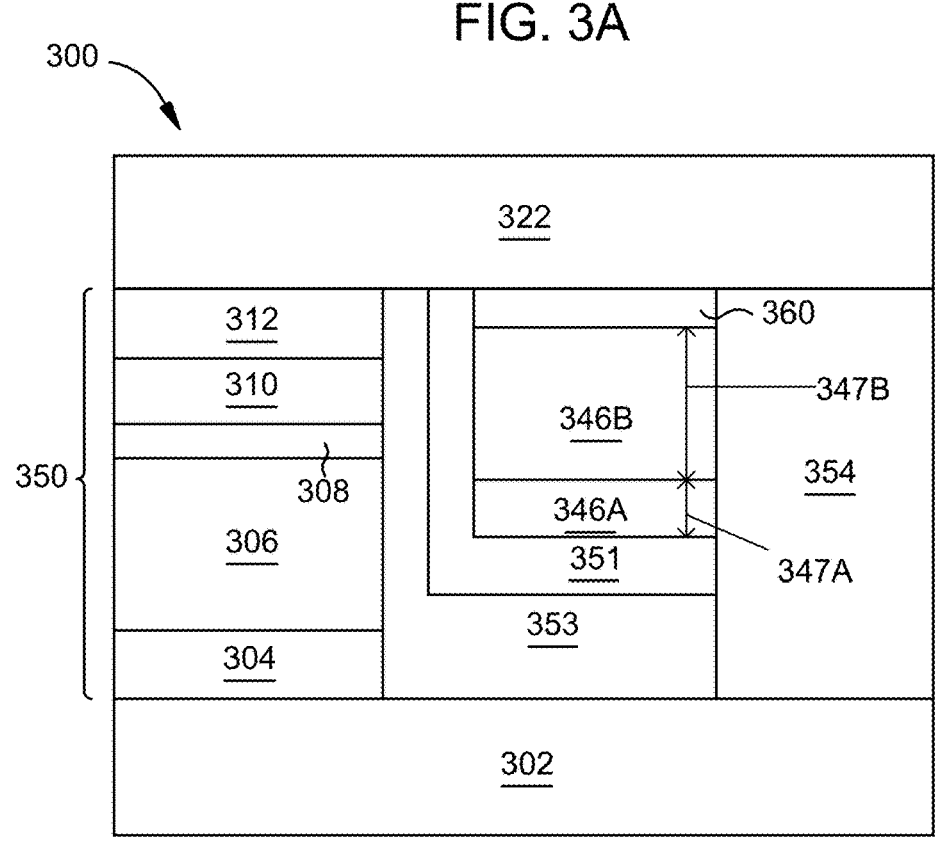
FIG. 3B is an APEX cross-sectional view of a single read head along a reader stripe height perpendicular to MFS, according to one embodiment.

FIGS. 3A-3B are schematic illustrations of a single read head 300. Aspects of FIGS. 3A-3B may be similar to the components of the magnetic read head 211. FIG. 3A is an MFS view of a single read head 300 with a dual free layer (DFL) sensor. The single read head 300 includes first shield (S1) 302, a seed layer 304, a first free layer (FL) 306, a barrier layer 308, a second FL 310, a cap 312, a second shield (S2) 322, and an insulation material 352. The seed layer 304, first FL 306, barrier layer 308, second FL 310, and cap 312 collectively may be referred to as the DFL sensor stack 350. It is understood that other materials not listed for each of the layers described herein are contemplated and the embodiments discussed herein are not limited to the materials listed for each of the layers of the DFL sensor. In the embodiments discussed herein, the seed layer, the first FL, the barrier layer, the second FL, and the cap may be referred to as a MTJ stack.

The S1 302 includes a magnetic permeable and electrically conductive material selected from the group that includes NiFe, CoFe, NiFeCo, alloys, and their combinations. S2 322 includes a magnetic permeable and electrically conductive material selected from the same group of materials as S1 302, or the same material exchange biased by a manganese based antiferromagnet such as IrMn, PtMn, and NiMn, or the combination of the two. The thickness of each of the S1 302 and the S2 322 may be between about 10 nm and about 500 nm. S1 302 and S2 322 are deposited by well-known deposition methods such as electroplating, electroless plating, or sputtering, or their combinations. Additionally, it is to be understood that while NiFe, CoFe, NiFeCo, IrMn, PtMn and NiMn have been exemplified as the S1 302 and S2 322 materials, other materials are contemplated and the embodiments discussed herein are not limited to NiFe, CoFe, NiFeCo, IrMn, PtMn and NiMn for the S1 302 and the S2 322.

A seed layer 304 is formed on the S1 302. The seed layer 304 is deposited by well-known deposition methods such as sputtering. The seed layer 304 includes a material selected from the group that includes tantalum (Ta), ruthenium (Ru), titanium (Ti) and their multilayers or alloys thereof. The seed layer 304 may have a thickness of between about 10 Å to about 50 Å. Additionally, it is to be understood that while Ta, Ru, Ti and their multilayers and alloys have been exemplified as the seed layer 304 materials, other materials are contemplated and the embodiments discussed herein are not limited to Ta, Ru, or Ti or their multilayers or alloys for the seed layer 304. For example, suitable materials for the seed layer 304 may also include Co, Hf, Zr, and alloys thereof such as CoHf and CoZr.

The first FL 306 is formed on the seed layer 304. The first FL 306 includes a CoFexB/CoFe multilayer stack. The CoFe layer may have a thickness of between about 3 Å to about 10 Å. The CoFexB layer may have a thickness of between about 30 Å to about 100 Å with x between 0 and 1 (i.e., the layer may have a non-stoichiometric amount of Fe). The first FL 306 may be formed by well-known deposition methods such as sputtering. Additionally, it is to be understood that while CoFexB/CoFe has been exemplified as the first FL 306 material, other materials are contemplated and the embodiments discussed herein are not limited to CoFexB/CoFe for the first FL 306.

The barrier layer 308 is formed on the first FL 306. The barrier layer 308 includes a material such as magnesium oxide (MgO) with a thickness of between about 10 Å to about 20 Å. It is to be understood that while MgO is exemplified as the barrier layer 308, other insulating materials are contemplated and the embodiments discussed herein are not limited to MgO for the barrier layer 308.

The second FL 310 is formed on the barrier layer 308. The second FL 310 includes a CoFe/CoFexB multilayer stack. The CoFe layer may have a thickness of between about 3 Å to about 10 Å. The CoFexB layer may have a thickness of between about 30 Å to about 100 Å and x between 0 and 1 (i.e., the layer may have a non-stoichiometric amount of Fe). The second FL 310 may be formed by well-known deposition methods such as sputtering. Additionally, it is to be understood that while CoFe/CoFexB has been exemplified as the second FL 310 material, other materials are contemplated and the embodiments discussed herein are not limited to CoFe/CoFexB for the second FL 310. The magnetic moments for the first FL 306 and the second FL 310 may be antiparallel due to the antiparallel biasing from the SAF SB.

The cap 312 is formed on the second FL 310. The cap 312 includes a material selected from the group that includes tantalum (Ta), ruthenium (Ru), titanium (Ti), other non-magnetic, electrically conductive materials and their multilayers. The cap 312 may be formed by well-known deposition methods such as sputtering. The cap 312 may have a thickness of between about 10 Å to about 100 Å. Additionally, it is to be understood that while Ta, Ru, Ti and their multilayers have been exemplified as the cap 312 materials, other materials are contemplated and the embodiments discussed herein are not limited to Ta, Ru, or Ti or their multilayers for the cap 312. For example, suitable materials for the cap 312 may also include Co, Hf, Zr, and alloys thereof such as CoHf and CoZr.

The single read head 300 further includes a first synthetic antiferromagnetic (SAF) soft bias (SB) (e.g., a side shield) that includes a first lower SB 316a, a first spacer 318a, and a first upper SB 320a and a second SAF SB that includes a second lower SB 316b, a second spacer 318b, and a second upper SB 320b. The first lower SB 316a and the second lower SB 316b each includes a material selected from the group that includes NiFe, CoFe, CoNi, CoFeNi, CoFeB, Co, and alloys thereof. The first lower SB 316a and the second lower SB 316b may be formed by well-known deposition methods such as sputtering. The first lower SB 316a and the second lower SB 316b may each have a thickness of between about 50 Å to about 150 Å. Additionally, it is to be understood that while NiFe, CoFe, CoNi, CoFeNi, CoFeB, and Co have been exemplified as the first upper SB 320a and the second upper SB 320b materials, other materials are contemplated and the embodiments discussed herein are not limited to NiFe, CoFe, CoNi, CoFeNi, CoFeB, and Co for the first lower SB 316a and the second lower SB 316b.

The first spacer 318a is formed on the first lower SB 316a and the second spacer 318b is formed on the second lower SB 316b. Suitable material for the first spacer 318a and the second spacer 318b includes ruthenium (Ru) at a thickness of between about 4 Å to about 10 Å. It is to be understood that while Ru has been exemplified as the first spacer 318a and the second spacer 318b material, other materials are contemplated and the embodiments discussed herein are not limited to Ru for the first spacer 318a and the second spacer 318b.

The first upper SB 320a and the second upper SB 320b each includes a material selected from the group that includes NiFe, CoFe, CoNi, CoFeNi, CoFeB, Co, and alloys thereof. The first upper SB 320a and the second upper SB 320b may be formed by well-known deposition methods such as sputtering. The first upper SB 320a and the second upper SB 320b may each have a thickness of between about 50 Å to about 200 Å. Additionally, it is to be understood that while NiFe, CoFe, CoNi, CoFeNi, CoFeB, and Co have been exemplified as the first upper SB 320a and the second upper SB 320b materials, other materials are contemplated and the embodiments discussed herein are not limited to NiFe, CoFe, CoNi, CoFeNi, CoFeB, and Co for the first upper SB 320a and the second upper SB 320b.

The insulation material 352 may be placed in the single read head 300, such that electrical shorting between the S1 302 and the S2 322 via the first SAF SB and the second SAF SB may be avoided. Suitable materials for the insulation material 352 include dielectric materials such as aluminum oxide, magnesium oxide, silicon oxide, silicon nitride, or combination(s) thereof. The insulation material 352 may be formed by well-known deposition methods such as atomic layer deposition (ALD) or sputtering. The insulation material 352 may have a thickness of between about 10 Å to about 50 Å.

In one embodiment, the first lower SB 316a and the second lower SB 316b are identical. Furthermore, the first upper SB 320a and the second upper SB 320b are identical. Also, the first spacer 318a and the second spacer 318b are identical.

FIG. 3B is an APEX cross-sectional view of a single read DFL head 300 along reader stripe height (SH). The single DFL read head 300 further includes rear hard bias (RHB) bulk layers 346A, 346B, insulation materials 353 and 354, a non-magnetic layer 360, and a RHB seed layer 351. The RHB bulk layers 346A, 346B, generate a magnetic field pointing towards the insulation material 354 and away from the following layers: the first FL 306, the barrier layer 308, the second FL 310, the cap 312, and the insulation material 353. Stated another way, the magnetic field of the RHB bulk layers 346A, 346B, is along an axis that is perpendicular to the MFS plane. The RHB bulk layers 346A, 346B, may include cobalt platinum (CoPt), and is magnetically decoupled from S2 322 by inserting a non-magnetic layer 360 between the RHB bulk layers 346A, 346B, and the S2 322. The non-magnetic cap layer 360 may include a material selected from the group that includes tantalum (Ta), ruthenium (Ru), titanium (Ti), alumina ($Al_2O_3$), silicon dioxide, and other non-magnetic materials.

Suitable materials for the insulation material 353 include dielectric materials such as aluminum oxide ($Al_2O_3$), magnesium oxide, silicon oxide, silicon nitride, and combination(s) thereof. The insulation material 353 may be formed by well-known deposition methods such as atomic layer deposition (ALD) or sputtering. The insulation material 353 may have a thickness of between about 10 Å to about 50 Å.

Suitable materials for the insulation material 354 include dielectric materials such as aluminum oxide, silicon oxide, and silicon nitride. The insulation material 354 may be formed by well-known deposition methods such as sputtering. The insulation material 354 may have a thickness between about 400 Å and about 800 Å.

The RHB bulk layers 346A, 346B are deposited on the RHB seed layer 351. The RHB seed layer 351 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 351 materials, other materials are contemplated and the embodiments discussed herein are not limited to Ta, W, or Ru for the RHB seed layer 351. The RHB seed layer 351 may be deposited by well-known deposition methods such as sputtering. Furthermore, the RHB seed layer 351 may have a thickness of about 20 Å to about 50 Å, such as about 26 Å to about 35 Å. It has been discovered that RHB seed layers 351 with thicknesses below the disclosed range results in RHB magnetics degradation. Additionally, it is contemplated that the RHB seed layer 351 may comprise multiple layers. In some embodiments, the seed layer 351 includes a first seed layer including tantalum (Ta) and a second seed layer including tungsten (W). The first seed layer is about 5 Å to about 25 Å, such as about 10 Å to about 15 Å. The second seed layer is about 10 Å to about 30 Å, such as about 15 Å to about 20 Å.

The RHB bulk layers 346A, 346B include a first bulk layer 346A and a second bulk layer 346B. The first bulk layer 346A is deposited using an argon (Ar) gas, such as in a sputtering deposition process. The first bulk layer 346A is deposited to a first thickness 347A on the RHB seed layer 351. The second bulk layer 346B is deposited to a second thickness 347B on the first bulk layer 346A using Xenon (Xe) gas, such as in a sputtering deposition process. The first thickness 347A is about 10 Å to about 50 Å, such as about 15 Å to about 45 Å, such as about 30 Å. The second thickness 347B of the second bulk layer is about 190 Å to about 240 Å, such as about 200 Å to about 230 Å, such as about 220 Å. The second thickness 347B of the second bulk layer is about 4 to 15 times of the first thickness 347A of the first bulk layer. A first density of the first bulk layer 346A is lower than a second density of the second bulk layer 346B. It has been discovered that a dual gas process including argon (Ar) sputtering followed by xenon (Xe) sputtering deposition provides enhanced properties relative to processes using argon alone or xenon alone. Relative density is determined based on density measurements of individual sputter deposited CoPt films and can also be characterized by the resistivity of sputter deposited individual CoPt films. Specifically, the Ar sputter deposited CoPt film has higher resistivity relative to Xe sputter deposited CoPt film due to Ar embedded into CoPt. Higher resistivity corresponds to lower density. Enhanced properties include enhancing coercivity (Hcr) of the film. The resulting DFL read head is robust against the application of longitudinal fields upon integration of the read head with a writer. The process of the present disclosure provides higher throughput relative to processes using argon only due to high deposition rate by xenon gas. Additionally, the dual RHB bulk layers enable thinner seed layers (e.g., 351) resulting in enhanced DFL read performance with expanded design space.

Figure 4A:
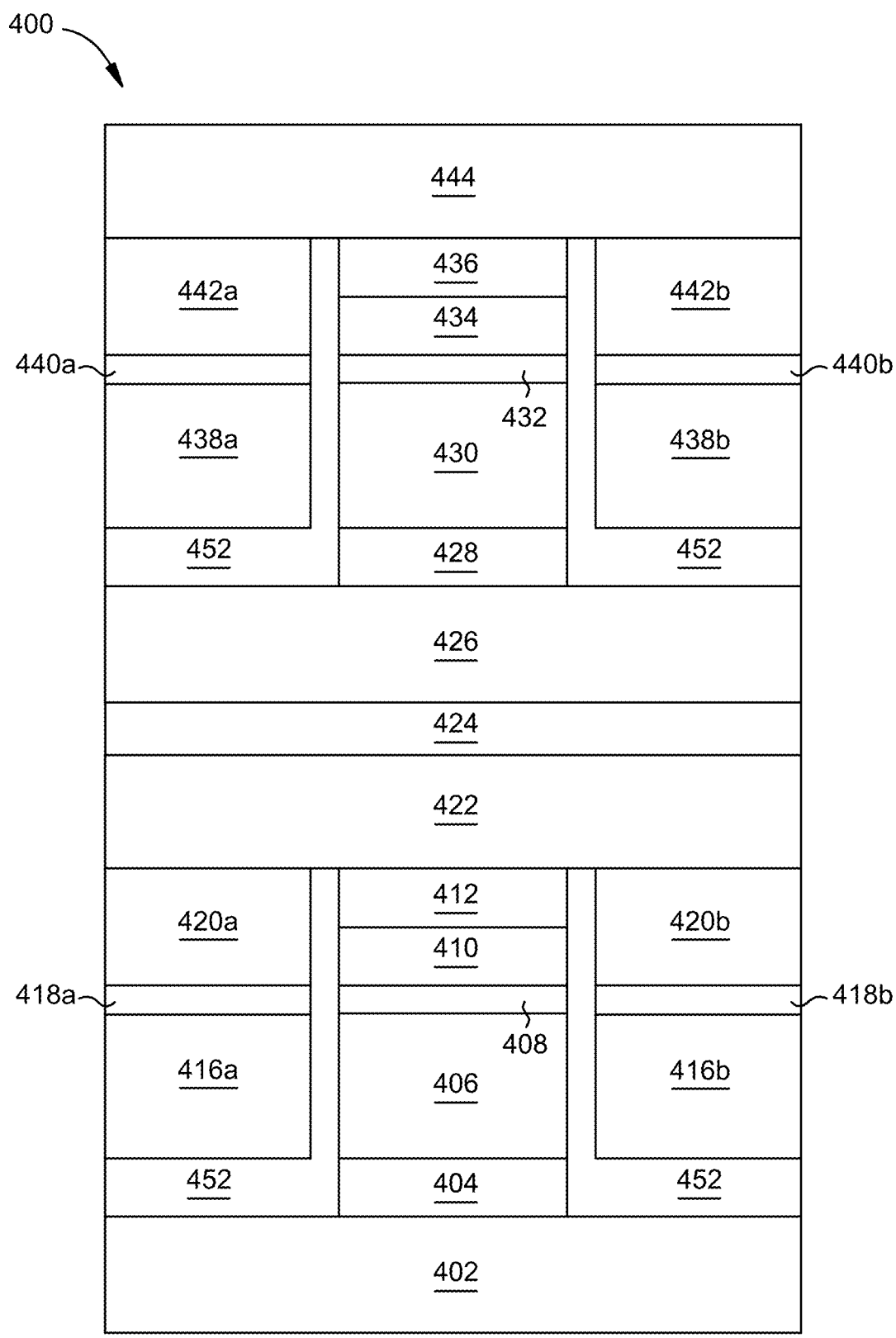
FIG. 4A is a schematic cross-sectional view of a TDMR read head from the media facing surface (MFS), according to one embodiment.
Figure 4B:
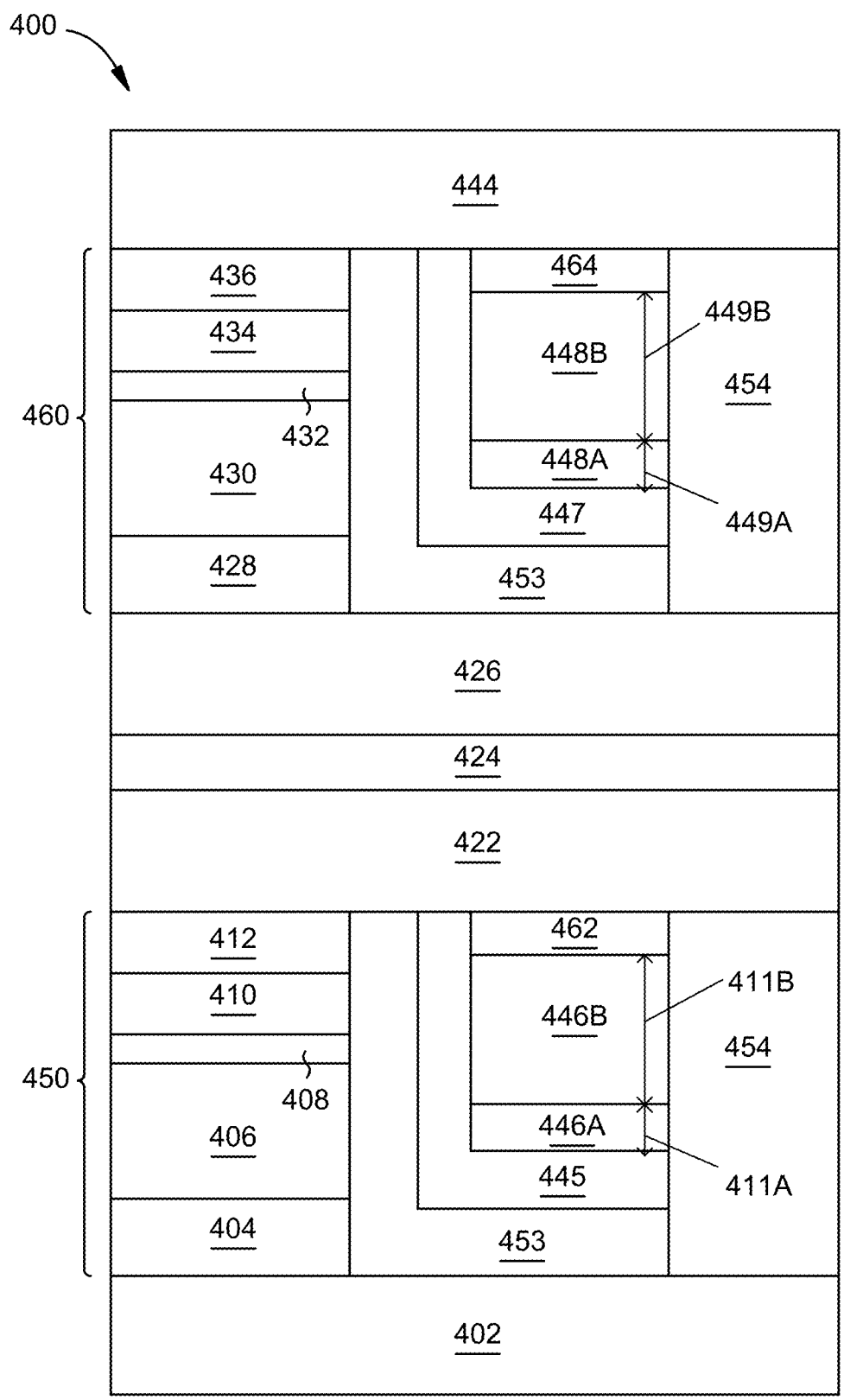
FIG. 4B is an APEX cross-sectional view of a TDMR read head along a reader stripe height perpendicular to MFS, according to one embodiment.

FIGS. 4A-4B are schematic illustrations of a TDMR DFL read head 400 according to one embodiment that contains two DFL sensor stacks 450, 460. Aspects of FIGS. 3A-3B may be similar to the description of the TDMR read head 400 of FIGS. 4A-4B. More specifically, the materials and thickness from the discussion of FIGS. 3A-3B are applicable to the discussion of FIGS. 4A-4B FIG. 4A is an ABS view of a TDMR read head 400, according to one embodiment. The TDMR read head 400 includes a first DFL read head portion that includes first shield (S1) 402, a seed layer 404, a first free layer (FL) 406, a barrier layer 408, a second FL 410, a cap 412, a second shield (S2) 422, and an insulation material 452. It is understood that other materials not listed for each of the layers described herein are contemplated and the embodiments discussed herein are not limited to the materials listed for each of the layers of the DFL sensor. In the embodiments discussed herein, the seed layer, the first FL, the barrier layer, the second FL, and the cap may be referred to as a MTJ stack.

The seed layer 404 includes a material selected from the group that includes tantalum, ruthenium, titanium, and combinations thereof. For example, suitable materials for the seed layer 404 may also include Co, Hf, Zr, and alloys thereof such as CoHf and CoZr. The first DFL read head portion further includes a first SAF SB that includes a first lower SB 416a, a first spacer 418a, and a first upper SB 420a and a second SAF SB that includes a second lower SB 416b, a second spacer 418b, and a second upper SB 420b. The magnetic moments for the first FL 406 and the second FL 410 may be antiparallel due to the antiparallel biasing from the SAF SB.

An insulating read separation gap (RSG) 424 separates the first DFL read head portion and the second DFL read head portion. The insulating RSG 424 may be formed by an oxide compound, such as $Al_2O_3$, or any other suitable insulating materials.

The TDMR read head 400 further includes the second DFL read head portion that includes a first shield (S1) 426, a seed layer 428, a first free layer (FL) 430, a barrier layer 432, a second FL 434, a cap 436, a second shield (S2) 444, and an insulation material 452. The seed layer 428 includes a material selected from the group that includes tantalum, ruthenium, titanium, and combinations thereof. For example, suitable materials for the seed layer 428 may also include Co, Hf, Zr, and alloys thereof such as CoHf and CoZr. The second DFL read head portion further includes a first SAF SB that includes a first lower SB 438a, a first spacer 440a, and a first upper SB 442a and a second SAF SB that includes a second lower SB 438b, a second spacer 440b, and a second upper SB 442b. The magnetic moments for the first FL 430 and the second FL 434 may be antiparallel due to the antiparallel biasing from the SAF SB.

FIG. 4B is an APEX view of a TDMR read head 400, according to another embodiment. The first DFL read head portion further includes rear hard bias (RHB) bulk layers 446A, insulation materials 453 and 454, a non-magnetic layer 462, and a RHB seed layer 445. The RHB bulk layers 446A, 446B generate a magnetic field pointing towards the insulation material 454 and away from the following layers: the first FL 406, the barrier layer 408, the second FL 410, the cap 412 and the insulation material 453. Stated another way, the magnetic field of the RHB bulk layers 446A, 446B is along an axis that is perpendicular to the MFS plane. The RHB bulk layers 446A, 446B may include cobalt platinum (CoPt), and is magnetically decoupled from S2 422 by inserting a non-magnetic layer 462 between the RHB bulk layers 446A, 446B and the S2 422. The non-magnetic layer 462 may include a material selected from the group that includes tantalum (Ta), ruthenium (Ru), titanium (Ti), alumina ($Al_2O_3$), silicon dioxide ($SiO_2$) and other non-magnetic, electrically conductive materials.

Suitable materials for the insulation material 452 include dielectric materials such as magnesium oxide (MgO), aluminum oxide ($Al_2O_3$), silicon oxide, silicon nitride, or combination(s) thereof. The insulation material 452 may be formed by well-known deposition methods such as atomic layer deposition (ALD) or sputtering. The insulation material 452 may have a thickness of between about 10 Å to about 50 Å.

The RHB bulk layers 446A, 446B is deposited on the RHB seed layer 445. The RHB seed layer 445 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 445 materials, other materials are contemplated and the embodiments discussed herein are not limited to Ta, W, or Ru for the RHB seed layer 445. The RHB seed layer 445 may be deposited by well-known deposition methods such as sputtering. Furthermore, the RHB seed layer 445 may have a thickness of about 20 Å to about 50 Å, such as about 26 Å to about 35 Å. Additionally, it is contemplated that the RHB seed layer 445 may comprise multiple layers. In some embodiments, the seed layer 445 includes a first seed layer including tantalum (Ta) and a second seed layer including tungsten (W). The first seed layer is about 5 Å to about 25 Å, such as about 10 Å to about 15 Å. The second seed layer is about 10 Å to about 30 Å, such as about 15 Å to about 20 Å.

The RHB includes a first bulk layer 446A and a second bulk layer 446B. The first bulk layer 446A is deposited using an argon (Ar) gas, such as in a sputtering deposition process. The first bulk layer 446A is deposited to a first thickness 411A on the RHB seed layer 445. The second bulk layer 446B is deposited to a second thickness 411B on the first bulk layer 446A using Xenon (Xe) gas, such as in a sputtering deposition process. The first thickness 411A is about 10 Å to about 50 Å, such as about 15 Å to about 45 Å, such as about 30 Å. The second thickness 411B of the second bulk layer is about 190 Å to about 240 Å, such as about 200 Å to about 230 Å, such as about 220 Å. The second thickness 411B of the second bulk layer is about 4 to 15 times of the first thickness 411A of the first bulk layer. A first density of the first bulk layer 446A is lower than a second density of the second bulk layer 446B.

Suitable materials for the insulation materials 453 and 454 include dielectric materials such as magnesium oxide, aluminum oxide, silicon oxide, silicon nitride, and combination(s) thereof. The insulation material 453 may be formed by well-known deposition methods such as ALD or sputtering. The insulation material 453 may have a thickness from about 10 Å to about 50 Å. The insulation material 454 may be formed by well-known deposition methods such as sputtering. The insulation material may have a thickness between about 400 Å and about 800 Å.

The second DFL read head portion further includes RHB bulk layers 448A, 448B, insulation materials 453 and 454, a non-magnetic layer 464, and a RHB seed layer 447. The RHB bulk layers 448A, 448B, generate a magnetic field pointing towards the insulation material 454 and away from the following layers: the first FL 430, the barrier layer 432, the second FL 434, the cap 436 and the insulation layer 453. Stated another way, the magnetic field of the RHB bulk layers 448A, 448B, is along an axis that is perpendicular to the MFS plane. The RHB bulk layers 448A, 448B, may include cobalt platinum (CoPt), and it is magnetically decoupled with S2 444 by inserting a non-magnetic layer 464 between the RHB bulk layers 448A, 448B, and the S2 444. The non-magnetic layer 464 may include a material selected from the group that includes tantalum (Ta), ruthenium (Ru), titanium (Ti), alumina ($Al_2O_3$), silicon dioxide ($SiO_2$) and other non-magnetic, electrically conductive materials.

Suitable materials for the insulation material 452 include dielectric materials such as magnesium oxide (MgO), aluminum oxide ($Al_2O_3$), silicon oxide, silicon nitride and combination(s) thereof. The insulation material 452 may be formed by well-known deposition methods such as atomic layer deposition (ALD) or sputtering. The insulation material 452 may have a thickness of between about 10 Å to about 50 Å. Suitable materials for the insulation materials 453 and 454 include dielectric materials such as magnesium oxide, aluminum oxide, silicon oxide, silicon nitride, combination(s) thereof. The insulation material 453 may be formed by well-known deposition methods such as ALD or sputtering. The insulation material 453 may have a thickness from about 10 Å to about 50 Å. The insulation material 454 may be formed by well-known deposition methods such as sputtering. The insulation material may have a thickness between about 400 Å and about 800 Å.

The RHB bulk layers 448A, 448B are deposited on the RHB seed layer 447. The RHB seed layer 447 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 447 materials, other materials are contemplated and the embodiments discussed herein are not limited to Ta, W, or Ru for the RHB seed layer 447. The RHB seed layer 447 may be deposited by well-known deposition methods such as sputtering. Furthermore, the RHB seed layer 447 may have a thickness of about 20 Å to about 50 Å, such as about 26 Å to about 35 Å.

Additionally, it is contemplated that the RHB seed layer 447 may comprise multiple layers. In some embodiments, the seed layer 447 includes a first seed layer including tantalum (Ta) and a second seed layer including tungsten (W). The first seed layer is about 5 Å to about 25 Å, such as about 10 Å to about 15 Å. The second seed layer is about 10 Å to about 30 Å, or about 15 Å to about 20 Å.

The RHB bulk layers 448A, 448B includes a first bulk layer 448A and a second bulk layer 448B. The first bulk layer 448A is deposited using an argon (Ar) gas, such as in a sputtering deposition process. The first bulk layer 448A is deposited to a first thickness 449A on the RHB seed layer 447. The second bulk layer 448B is deposited to a second thickness 449B on the first bulk layer 448A using Xenon (Xe) gas, such as in a sputtering deposition process. The first thickness 449A is about 10 Å to about 50 Å, such as about 15 Å to about 45 Å, such as about 30 Å. The second thickness 449B of the second bulk layer is about 190 Å to about 240 Å, such as about 200 Å to about 230 Å, such as about 220 Å. The second thickness 449B of the second bulk layer is about 4 to 15 times of the first thickness 449A of the first bulk layer. A first density of the first bulk layer 448A is lower than a second density of the second bulk layer 448B.

One or more of the RHB layers described herein may include first bulk layer with a first argon concentration and a second bulk layer with a second argon concentration, the second argon concentration is zero, or less than the first argon concentration.

EXAMPLES

Figure 5:
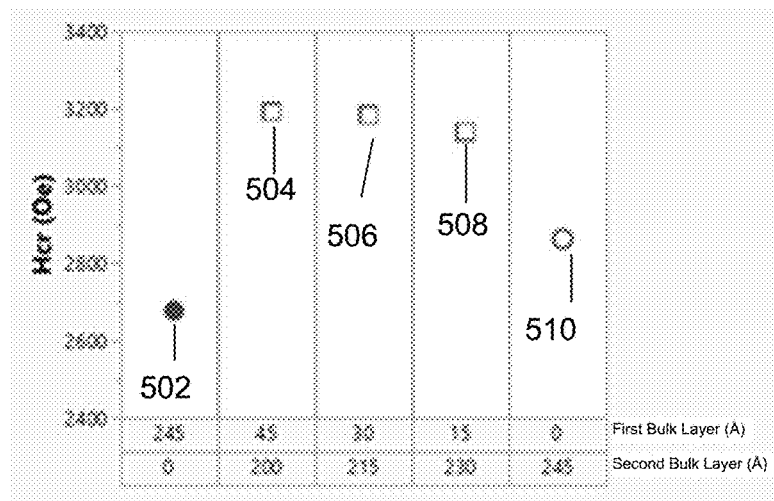
FIG. 5 depicts plot graphs illustrating coercivity (Hcr) of RHB monitor films as a function of first and second bulk layer thickness and thickness ratio, according to various embodiments.
Figure 6:
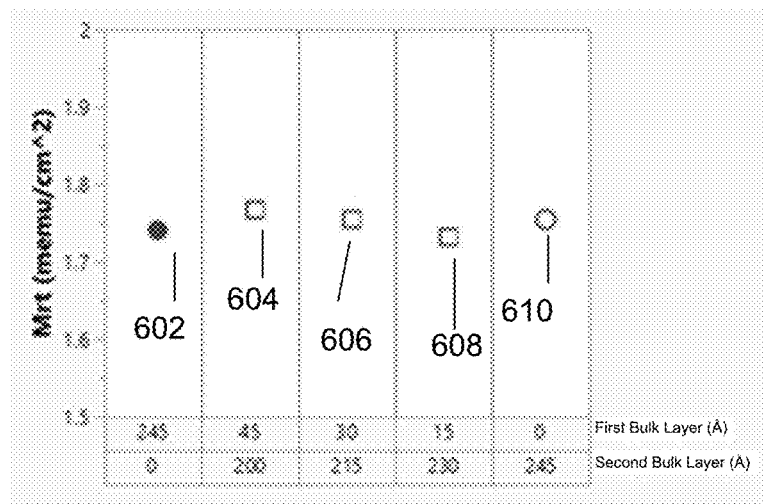
FIG. 6 depicts plot graphs illustrating remnant magnetization thickness product (Mrt) of RHB monitor films as a function of first and second bulk layer thickness and thickness ratio, according to various embodiments.
Figure 7:
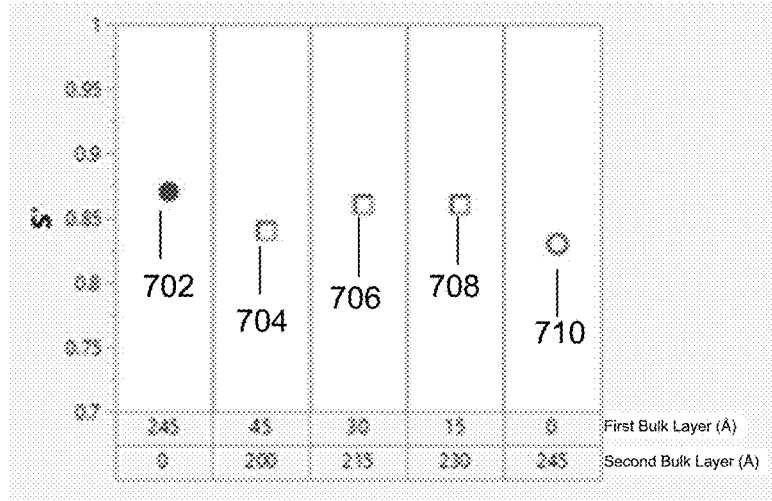
FIG. 7 depicts plot graphs illustrating squareness (S') of RHB monitor films as a function of first and second bulk layer thickness and thickness ratio, according to various embodiments.

FIGS. 5-7 are plot graphs illustrating the magnetic properties of RHB monitor films as a function of first and second bulk layer thickness ratios. The RHB monitor film includes a multi-layer seed structure, such as a Ta containing layer and a W containing layer. A CoPt containing RHB bulk layer is deposited over the W containing seed layer. The CoPt containing RHB bulk layer includes a first bulk layer that is deposited using Ar gas and a second bulk layer that is deposited using Xe gas. Each of the plots depicts RHB monitor films having the same total thickness, with different ratio of thicknesses between the first bulk layer and the second bulk layer. As used herein, the ratio of thickness between the first bulk layer and the second layer is referred to as "thickness ratio(s)."

RHB coercivity as a function of thickness ratios is shown in FIG. 5. Plot 502 depicts an RHB monitor film including an RHB structure having a single first bulk layer deposited with Ar gas and having a thickness of 245 Å and thickness ratio of 245:0. The coercivity of plot 502 was about 2650 Oersted (Oe) to about 2700 Oe. Plot 510 depicts an RHB monitor film including an RHB structure having a single second bulk layer deposited with Xe gas and having a thickness of 245 Å and thickness ratio of 0:245. The coercivity of plot 510 is about 2800 Oe to about 2900 Oe. Plots 504, 506, and 508 depict RHB monitor films having dual bulk layers (first bulk layer deposited with Ar and second bulk layer deposited with Xe) with different thickness ratios, 45:200, 30:215, and 15:230, respectively, as described in the present disclosure. The RHB monitor films include coercivities ranging from about 3100 Oe to about 3300 Oe, such as about 3200 Oe. In particular, a significant improvement from plot 502 to plot 504 is shown, comparing Ar gas deposited first bulk layer plot 502 and a dual RHB bulk layer having thickness ratio of 45:200. Moreover, the improvement relative to plot 502 is retained at further reduced thickness in the first bulk layer, such as plot 506 having a thickness ratio of 30:215 and plot 508 having thickness ratio of 15:230.

The magnetic properties of RHB process monitor films having a first and second bulk layer illustrate enhanced coercivity (Hcr) while maintaining other magnetic properties, such as remnant magnetization thickness product (Mrt) and squareness (S') relative to RHB process monitor films having a first bulk layer alone or a second bulk layer alone.

FIG. 6 depicts comparative plots (e.g., 602, 604, 606, 608, 610) for Mrt as a function of thickness ratios, which, like FIG. 5, are ratios of a first bulk layer deposited with Ar to a second bulk layer deposited with Xe. Plot 602 depicts an Mrt of an RHB bulk layer having a thickness of 245 Å deposited entirely with Ar gas, plot 604 depicts an Mrt of an RHB structure with a thickness ratio of 45:200, plot 606 depicts an Mrt of an RHB structure with a thickness ratio of 30:215, plot 608 depicts an Mrt of an RHB structure with a thickness ratio of 15:230, and plot 610 depicts an Mrt of an RHB structure with a thickness ratio of 0:245. In each case, Mrt was about 1.7 to about 1.8 memu/cm$^2$ as measured at a total bulk thickness of the first and second bulk layer of about 245 Å.

FIG. 7 depicts comparative plots (e.g., 702, 704, 706, 708, 710) for S' as a function of thickness ratios, which, like FIG. 5, are ratios of a first bulk layer deposited with Ar to a second bulk layer deposited with Xe. Plot 602 depicts an S' of an RHB bulk layer having a thickness of 245 Å deposited entirely with Ar gas, plot 604 depicts an S' of an RHB structure with a thickness ratio of 45:200, plot 606 depicts an S' of an RHB structure with a thickness ratio of 30:215, plot 608 depicts an S' of an RHB structure with a thickness ratio of 15:230, and plot 610 depicts an S' of an RHB structure with a thickness ratio of 0:245. In each case, S' was measured at about 0.825 to about 0.875 as measured at a total bulk thickness of the first and second bulk layer of about 245 Å.

Without being bound by theory, based on the observation shown in FIGS. 5, 6, and 7, it is believed that the Ar atoms from the Ar sputter gas rebounds from the CoPt target back to the CoPt film during sputtering because Ar is lighter than CoPt. The Ar atoms expand the lattice structure within the CoPt film at the RHB bulk layer and seed layer interface to better match the underlying tungsten seed layer. Similar behavior can be observed for seed layers having other compositions, such as other underlying metal seed layers.

Figure 8:
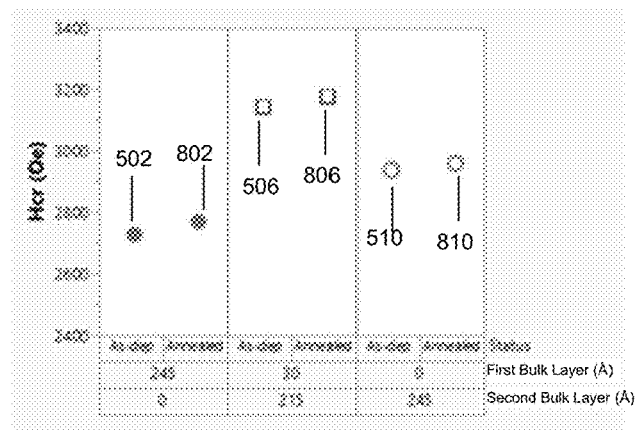
FIG. 8 depicts plot graphs illustrating coercivity (Hcr) of RHB monitor films as-deposited and after TMR annealing, according to various embodiments.
Figure 9:
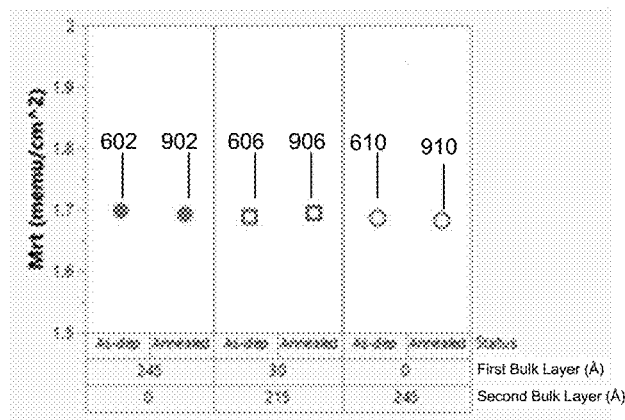
FIG. 9 depicts plot graphs illustrating remnant magnetization thickness product (Mrt) of RHB monitor films as-deposited and after TMR annealing, according to various embodiments.
Figure 10:
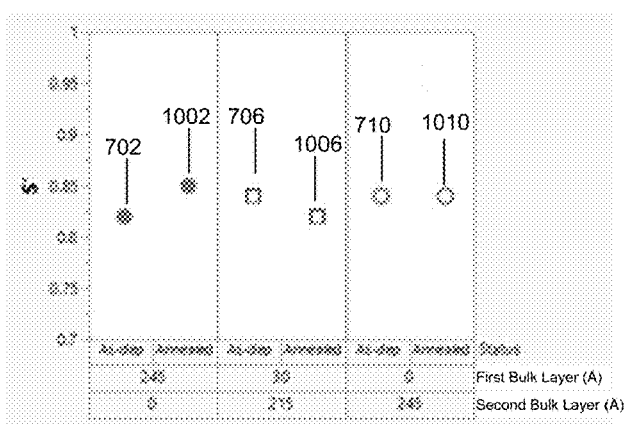
FIG. 10 depicts plot graphs illustrating squareness (S') of RHB monitor films as-deposited and after TMR annealing, according to various embodiments.

FIGS. 8-10 are plot graphs illustrating the magnetic properties of RHB monitor films as a function of first and second bulk layer thickness ratios and comparing as-deposited properties with properties after TMR annealing. TMR annealing includes annealing at a temperature of about 270° C. for about 5 hours under a magnetic field of about 5 Tesla. The RHB monitor films include a multi-layer seed structure, such as a Ta containing layer and a W containing layer. A CoPt containing RHB bulk layer is deposited over the W containing seed layer. The CoPt containing RHB bulk layer includes a first bulk layer that is deposited using Ar gas and a second bulk layer that is deposited using Xe gas. Each of the plots depict RHB monitor films having the same total thickness, with different thickness ratios.

FIG. 8 depicts RHB coercivity as a function of thickness ratios for each as-deposited RHB monitor film (e.g., plots 502, 506, 510) and for each annealed RHB monitor film (e.g., plots 802, 806, 810). As can be seen, the coercivity measurements as-deposited and after anneal were substantially the same.

Similarly, FIG. 9 depicts RHB Mrt as a function of thickness ratios for each as-deposited RHB monitor film (e.g., plots 602, 606, 610) and for each annealed RHB monitor film (e.g., plots 902, 906, 910). As can be seen, the Mrt measurements as-deposited and after anneal were substantially the same.

Furthermore, FIG. 10 depicts RHB S' as a function of thickness ratios for each as-deposited RHB monitor film (e.g., plots 702, 706, 710) and for each annealed RHB monitor film (e.g., plots 1002, 1006, 1010). As can be seen, the S' measurements as-deposited and after anneal were substantially the same. Based on the retained properties depicted in FIGS. 8, 9, and 10, the RHB structure of the present disclosure had good thermal stability.

Figure 11:
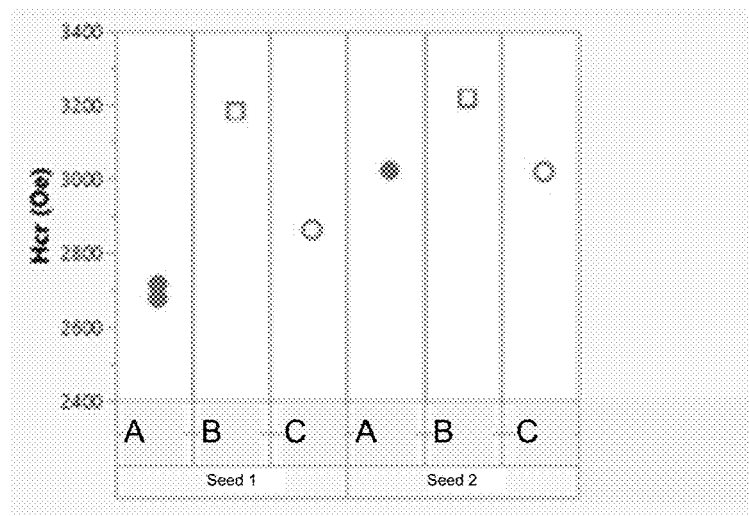
FIG. 11 depicts plot graphs illustrating coercivity (Hcr) of RHB monitor films comparing two different seed structures underlying the bulk layers, according to various embodiments.
Figure 12:
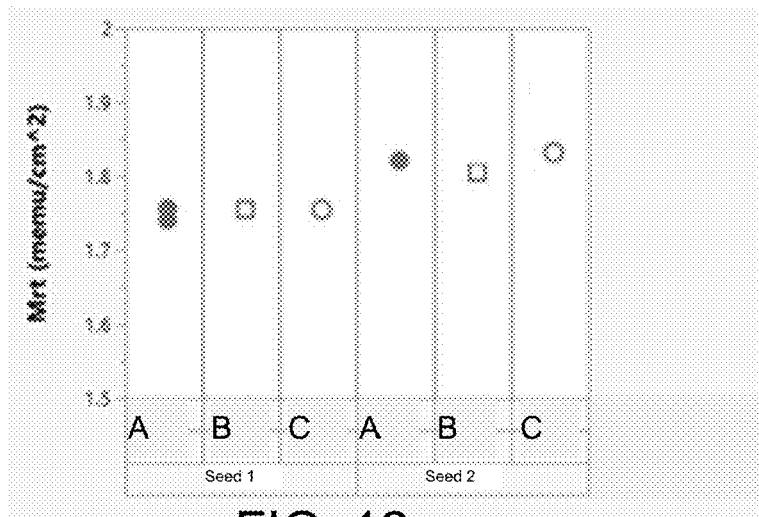
FIG. 12 depicts plot graphs illustrating remnant magnetization thickness product (Mrt) of RHB monitor films comparing two different seed structures underlying the bulk layers, according to various embodiments.
Figure 13:
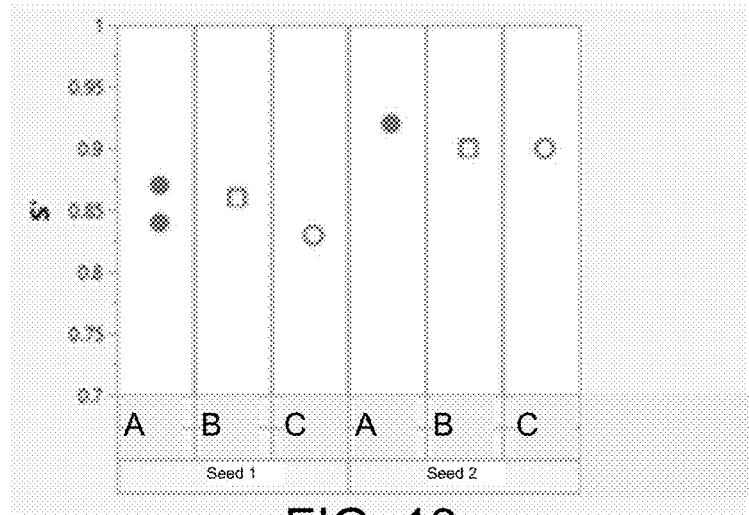
FIG. 13 depicts plot graphs illustrating squareness (S') of RHB monitor films comparing two different seed structures underlying the bulk layers, according to various embodiments.

FIGS. 11-13 depict plot graphs illustrating the magnetic properties of RHB monitor films as a function of first and second bulk layer thickness ratios and comparing two different seed structures underlying the bulk layers.

The RHB monitor films include a multi-layer seed structure, such as a Ta containing layer and a W containing layer. A CoPt containing RHB bulk layer is deposited over the W containing seed layer. The CoPt containing RHB bulk layer includes a first bulk layer that is deposited using Ar gas and a second bulk layer that is deposited using Xe gas.

Seed structure, "Seed 1," includes a first Ta containing layer having a thickness of about 11 Å and a second W containing layer having a thickness of about 18 Å. Seed structure, "Seed 2," includes a first Ta containing layer having a thickness of about 20 Å and a second W containing layer having a thickness of about 26 Å.

RHB bulk layer "A" includes a first bulk layer deposited with Ar gas at a thickness of 245 Å. RHB bulk layer "B" includes a first bulk layer deposited with Ar gas at a thickness of 30 Å and a second bulk layer deposited with Xe gas at a thickness of 215 Å. RHB bulk layer "C" includes a second bulk layer deposited with Xe gas at a thickness of 245 Å. FIG. 11 shows Hcr measurements for each of the RHB bulk layers A, B, and C with Seed 1 compared with each of the RHB bulk layers with Seed 2. Each of RHB bulk layers A and C show differences in Hcr when comparing Seed 1 and Seed 2. In contrast, RHB bulk layer B including the first bulk layer and the second bulk layer maintained Hcr when comparing structures containing Seed 1 with structures containing Seed 2. As can be seen, Hcr values of RHB bulk layer B, such as the RHB layers of the present disclosure, is not sensitive to the underlying seed layers such as the thicknesses of the underlying seed layers. The results for Mrt and S' is shown FIG. 12 and FIG. 13. Both Mrt and S' degrade with reduced seed thickness from Seed 2 to Seed 1 regardless of the type of RHB bulk layers. The reduced sensitivity in Hcr to seed thickness for RHB bulk layer B enables more efficient DFL read head designs having a large transverse field and enhanced longitudinal field robustness with larger Hcr.

Dual gas deposition process including an argon gas followed by a xenon gas to deposit the RHB bulk layer produces a dual free layer (DFL) read head with enhanced properties, such as good thermally stability and enhanced coercivity. The RHB bulk layer process reduces sensitivity to seed layer thickness and increases DFL read head design efficiency. Depositing using xenon gas increases throughput relative to depositing using argon gas alone.

In one embodiment, a magnetic read head comprises: a first shield; a second shield spaced from the first shield; a sensor disposed between the first shield and the second shield; and a rear hard bias (RHB) structure disposed between the first shield and the second shield, and recessed from a media facing surface (MFS), wherein the RHB structure comprises: a RHB seed layer, a first bulk layer comprising a first RHB density; and a second bulk layer comprising a second RHB density, wherein the first RHB density is different from the second RHB density. The RHB structure comprises an RHB coercivity (Hcr) of about 3100 Oersted (Oe) to about 3200 Oe. RHB structure comprises a remnant magnetization thickness (Mrt) of about 1.7 to about 1.8 memu/cm$^2$ at a total bulk thickness of the first and second bulk layer of about 245 Å. The RHB structure comprises having a squareness (S') of about 0.825 to about 0.875 as measured at a total bulk thickness of the first and second bulk layer of about 245 Å. A second thickness of the second bulk layer is about 4 to 15 times of a first thickness of the first bulk layer. The first thickness of the first bulk layer is about 15 Å to about 45 Å and the second thickness of the second bulk layer is about 200 Å to about 230 Å. The first RHB density is lower than the second RHB density. The second bulk layer is closer to the second shield as compared to the first bulk layer relative to the second shield. The first bulk layer and the second bulk layer each comprise CoPt. The RHB seed layer is selected from the group consisting of tantalum (Ta), tungsten (W), combinations thereof, and alloys thereof. The RHB seed layer comprises a multilayer structure and wherein the multilayer structure has a collective thickness of about 26 Å to about 46 Å. The seed layer comprises: a first seed layer comprising a first seed thickness of about 11 Å to about 20 Å; and a second seed layer comprising a second seed thickness of about 15 Å to about 26 Å.

In one embodiment, a magnetic read head comprises: a first shield; a dual free layer (DFL) sensor; a rear hard bias (RHB) structure, wherein the RHB comprises: a seed layer; a first bulk layer; and a second bulk layer, wherein the RHB structure comprises an RHB coercivity (Hcr) greater than 3100 Oe. The seed layer comprises: a tantalum containing layer; and a tungsten containing layer, wherein a total thickness of the seed layer is about 26 Å to about 46 Å. The first bulk layer comprises argon. A concentration of argon in the first bulk layer is higher than a concentration of argon in the second bulk layer.

In one embodiment, a magnetic read head comprises: a first shield; a second shield spaced from the first shield; a sensor disposed between the first shield and the second shield; and a rear hard bias (RHB) structure disposed between the first shield and the second shield, and recessed from the sensor. RHB structure comprises: a multilayer seed structure; a first bulk layer comprising CoPt and having a first bulk thickness; and a second bulk layer comprising CoPt and having a second bulk thickness, wherein the second thickness is about 4 to 15 times of the first thickness of the first bulk layer. A magnetic recording device comprising the magnetic read head having an RHB structure with the first and second bulk layer is provided.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head, comprising:
    a first shield;
    a second shield spaced from the first shield;
    a sensor disposed between the first shield and the second shield; and
    a rear hard bias (RHB) structure disposed between the first shield and the second shield, and recessed from a media facing surface (MFS), wherein the RHB structure comprises:
        a seed layer;
        a first bulk layer comprising a first RHB density; and
        a second bulk layer comprising a second RHB density, wherein the first RHB density is different from the second RHB density.

2. The magnetic read head of claim 1, wherein the RHB structure comprises an RHB coercivity (Hcr) of about 3100 Oersted (Oe) to about 3200 Oe as measured at a total bulk thickness of the first and second bulk layer of about 225 Å to about 265 Å.

3. The magnetic read head of claim 1, wherein the RHB structure comprises a remnant magnetization thickness (Mrt) of about 1.7 to about 1.8 memu/cm$^2$, as measured at a total bulk thickness of the first and second bulk layer of about 225 Å to about 265 Å.

4. The magnetic read head of claim 3, wherein the RHB structure comprises having a squareness (S') of about 0.825 to about 0.875, as measured at a total bulk thickness of the first and second bulk layer of about 225 Å to about 265 Å.

5. The magnetic read head of claim 1, wherein a second thickness of the second bulk layer is about 4 to 15 times of a first thickness of the first bulk layer.

6. The magnetic read head of claim 5, wherein the first thickness of the first bulk layer is about 15 Å to about 45 Å and the second thickness of the second bulk layer is about 200 Å to about 230 Å, wherein a total bulk thickness of the first and second bulk layer is about 225 Å to about 265 Å.

7. The magnetic read head of claim 1, wherein the first RHB density is lower than the second RHB density.

8. The magnetic read head of claim 1, wherein the second bulk layer is closer to the second shield as compared to the first bulk layer relative to the second shield.

9. The magnetic read head of claim 1, wherein the first bulk layer and the second bulk layer each comprise CoPt.

10. The magnetic read head of claim 1, wherein the RHB seed layer is selected from the group consisting of tantalum (Ta), tungsten (W), combinations thereof, and alloys thereof.

11. The magnetic read head of claim 1, wherein the seed layer comprises a multilayer structure and wherein the multilayer structure has a collective thickness of about 26 Å to about 46 Å.

12. The magnetic read head of claim 11, wherein the seed layer comprises:
    a first seed layer comprising a first seed thickness of about 11 Å to about 20 Å; and
    a second seed layer comprising a second seed thickness of about 15 Å to about 26 Å.

13. A magnetic recording device comprising the magnetic read head of claim 1.

* * * * *